(12) United States Patent
Heestermans

(10) Patent No.: US 11,148,538 B2
(45) Date of Patent: Oct. 19, 2021

(54) SYSTEM FOR COUPLING VEHICLES TO AN ELECTRIC CHARGING STATION

(71) Applicant: Alexander Adrianus Henricus Gerardus Heestermans, Galder (NL)

(72) Inventor: Alexander Adrianus Henricus Gerardus Heestermans, Galder (NL)

( * ) Notice: Subject to any disclaimer, the term of this patent is extended or adjusted under 35 U.S.C. 154(b) by 112 days.

(21) Appl. No.: 16/635,965

(22) PCT Filed: Jul. 31, 2018

(86) PCT No.: PCT/IB2018/055724
§ 371 (c)(1),
(2) Date: Jan. 31, 2020

(87) PCT Pub. No.: WO2019/025968
PCT Pub. Date: Feb. 7, 2019

(65) Prior Publication Data
US 2020/0238840 A1    Jul. 30, 2020

(30) Foreign Application Priority Data

Aug. 1, 2017   (BE) .................................. 2017/5537

(51) Int. Cl.
*B60L 53/16* (2019.01)
*B60L 53/66* (2019.01)
*B60L 53/35* (2019.01)

(52) U.S. Cl.
CPC ............... *B60L 53/16* (2019.02); *B60L 53/35* (2019.02); *B60L 53/66* (2019.02)

(58) Field of Classification Search
CPC ........... B60L 53/16; B60L 53/35; B60L 53/66
See application file for complete search history.

(56) References Cited

U.S. PATENT DOCUMENTS

| 5,523,666 | A | * | 6/1996 | Hoelzl | ................. | H02J 7/0042 |
| | | | | | | 320/109 |
| 8,038,478 | B2 | | 10/2011 | Olsson et al. | | |
| 8,138,718 | B2 | * | 3/2012 | Dower | .................... | B60L 53/31 |
| | | | | | | 320/109 |
| 10,017,062 | B2 | | 7/2018 | Kufner et al. | | |
| 2007/0030645 | A1 | | 2/2007 | Herberholt et al. | | |
| 2007/0126395 | A1 | | 6/2007 | Suchar | | |

FOREIGN PATENT DOCUMENTS

| CH | 688599 A5 | 11/1997 |
| DE | 4344563 C1 | 12/1994 |
| DE | 102009023409 A1 | 12/2010 |
| FR | 2828589 A1 | 2/2003 |
| WO | 2008/147279 A1 | 12/2008 |
| WO | 2009/070334 A1 | 6/2009 |
| WO | 2015/104080 A1 | 7/2015 |

OTHER PUBLICATIONS

International Search Report and Written Opinion, dated Nov. 23, 2018, from corresponding PCT application No. PCT/IB2018/055724.

* cited by examiner

*Primary Examiner* — David V Henze-Gongola
(74) *Attorney, Agent, or Firm* — Nixon & Vanderhye

(57) ABSTRACT

System for coupling electric-powered vehicles to a power source, the system consisting of at least an automatic fold-out and extendable connector on the vehicle which is provided with five electrodes which can extend even further, and a wall socket mounted to a charging station with five contact electrodes which are accessible via five vertical slots and can be used without requiring any handling by the driver or another external person.

22 Claims, 5 Drawing Sheets

SYSTEM FOR COUPLING VEHICLES TO AN ELECTRIC CHARGING STATION

BACKGROUND OF THE INVENTION

Field of the Invention

The present invention relates to a system for coupling vehicles to an electric charging station.

The system makes it possible to couple vehicles to a charging station with the purpose of transferring the electrical energy of the charging station to the vehicle or vice versa.

More particularly, the invention is intended for vehicles that have a need to store electrical energy, such as electric-powered vehicles, or vehicles that use electrical energy for cooling units or heating installations on the vehicle.

Description of the Related Art

In cold regions it is known to couple vehicles to the electricity grid to keep the engine block or the oil in the gear box warm. In warm regions the use of cool stores on lorries is known for the transport of perishable goods.

All kinds of vehicles are known that use electricity from batteries or accumulators such as forklift trucks, golf carts, but mostly electric-powered or hybrid-powered cars and vans.

Several examples of these vehicles are commercially offered. After consumption of the stored energy, the storage media of such vehicle needs to be recharged, in order to have new energy for propulsion or for other applications.

Traditionally, the vehicle is charged by coupling the vehicle to a charging station via an electrical cord with plug(s), analogue to charging batteries on the public electricity grid.

Traditionally, for electric vehicles this is an electrical cord that is attached via a first plug to a wall socket of the power source, with a second plug to a socket in the vehicle that needs to be charged.

A disadvantage of such a coupling via a cord is that the driver or someone else has to insert the plug(s) and uncouple it again, and must get out of the vehicle, or request external help of others.

A second disadvantage of such a coupling via an electrical cord, is that the cord can hinder the users, because they can stumble over it, or because they forget to uncouple the cord after charging.

A third disadvantage of such cord connection is that the wire in the cord can be easily damaged by external factors such as vandalism or atmospheric circumstances in so far that the coupling is in open air, which can result in dangerous discharges or short circuits.

To provide a solution for these disadvantages, alternative systems have been developed to cordlessly couple a vehicle to a charger by means of a connector at the front of the vehicle which can make a connection with a wall socket of a charger by the movement of the vehicle itself, and without requiring any handling of the driver or another external person.

FR 2828589 describes a plug on a vehicle that can co-operate with a wall socket on a charging station. The connection between vehicle and charging station is formed in a surface parallel with the base. The wall socket on the charging station can cover a semi-circular trajectory.

US 2007/0030645 describes a connection system for the charging of a vehicle whereby the female wall socket on the charging station is suspended in a restricted movable way between springs, and the male plug on the vehicle can be connected with the female connector by moving the vehicle to the female wall socket.

CH 688599 describes a wall socket on a stationary charging station and a connector on a vehicle, whereby both are sprung and the power charging can be switched on and off by movable components.

US 2007/0126395 describes a plug on a vehicle that can make contact with a charging station, whereby the latter automatically registers the identity of the customer to send the bill for the purchased electricity.

WO 2008/147279 describes a wireless electric plug on a vehicle for the charging with electrical energy at a charging station which contains multiple movable pre-suspended pins next to each other, which can be pushed further in the connector of the charging station until a key comes into contact with one of these pins and an electrical contact is formed between the key and the charging station via guiding surfaces on the key and in the charging station. For example, five pins and one key can be used to realize the connection.

DE 4344563 C1 describes a plug on a vehicle that can co-operate with a wall socket on a charging station (FIG. 1), whereby the height of the wall socket above the ground surface is automatically adjusted to the height of the plug on the vehicle that needs to plug into it. The plug on the vehicle is movable in the longitudinal direction of the vehicle and is moved forward by a control unit (18) in the front of the car to make contact with the wall socket by moving its two vertically aligned electrodes forward against the conductive contact surfaces (13) of the wall socket.

WO 2009/070334 A1 describes a fold-out plug on a vehicle in the form of a deployable flap (471) that can be raised and lowered to make contact with an electrical contact (22) of a docking bay, located on the ground surface in a fixed position. When contact is made, the battery of the vehicle can be charged.

Some of these known systems have the disadvantage that the connector on the front or back of the vehicle is not hidden and is not protected against vandalism.

These systems also have the disadvantage to only allow a limited difference in height of the plug on the vehicle above the ground surface and in this way are unsuitable for use in higher lorries as well as lower small cars with a same socket at the charging station.

SUMMARY OF THE INVENTION

The purpose of the present invention is to provide a solution for one or more of the aforementioned and other disadvantages.

To this end, the invention relates to a system for coupling electricity consuming vehicles to a source of electrical energy, with an automatic fold-out connector or a forwardly extendable connector on the front of a vehicle whereby the connector is provided with five electrodes that are extendable from the connector in the direction of a socket attached to a charging station with five contact electrodes which are accessible via five vertical slots. The connector is installed in the front or at the back on the vehicle and whereby this connector can make or interrupt a cordless connection with the wall socket of the charging station by the movement of the vehicle itself, and this without requiring any handling by the driver or another external person.

An advantage of this system is that the system can be fitted to the existing electricity grid at for example the home address of the owner of the vehicle, on the wall of his parking at home, but also on a wall of another location such as his work destination, a car park or a wholesaler.

Another advantage of this system is that it can ensure a greater spread of distribution points such that the driver can charge his vehicle practically everywhere when parking, for example when shopping, at home or at work, in so far that these places are equipped with a suitable wall socket.

Another advantage is that this system can be simply and inexpensively installed in a general way and that it requires no specific skill of the driver to realize the coupling and possibly can be used as a universal standard and this both for higher and lower vehicles.

An added advantage is that the system is protected against external influences, such as atmospheric conditions, pollution or damage following the moving of the vehicle.

An advantage is also that the driver does not have to leave the vehicle to make or afterwards to interrupt the connection. Nor is any external personnel needed to make charging possible.

Another advantage is that the connection is cordless, and that the driver cannot forget to disconnect the cord on leaving.

Preferably, the automatic fold-out connector is mounted behind the vehicle's license plate, in the front or at the back of the vehicle.

Preferably, the automatic fold-out connector can automatically fold out from a vertical position to a horizontal position, via a control button in the vehicle or via an electronic signal. The folding out can be a folding up around a rotation axis at the top of the connector, or a folding down around a rotation axis at the bottom of the connector.

Preferably, the automatic fold-out connector or the forwardly extendable connector can extend its five electrodes in the direction of the socket attached to a charging station by means of a mechanical system, whereby the five contact electrodes move horizontally in the direction of the electrodes in the wall socket.

Preferably, in a next step the five electrodes themselves are inserted in the vertical slots in the wall socket whereby electrical contact is made and the vehicle can optionally be locked to the wall socket.

Preferably, the five electrodes automatically transfer electrical energy from the charging station to a battery in the vehicle after contact is made with a sensor in the wall socket.

Preferably, via at least one of the extended electrodes, data is transmitted from the vehicle to the charging station, such as the identification of the vehicle, and the owner, credit card or fuel card for example to which the delivered energy needs to be billed, but data of the charging station is also transmitted to the vehicle, such as the amount of delivered energy during the charge, the time and location of the charge and identification details of the charging station.

The charging can be interrupted by sending an electronic signal from the vehicle to the connected charging station or by interrupting the physical contact of the electrodes with the charging station by mechanically retracting the electrodes again.

After the charging in a following step the vehicle can be unlocked whereby the five electrodes are retracted into the connector and the electrical contact is interrupted.

In a next step after retraction, the vehicle will reverse and subsequently the connector will return to its original position by retracting or by folding in again to a vertical position, such that the license plate is visible again for the traffic on the usual spot on the vehicle.

Consequently, the location of the plug on the vehicle is invisible, with the advantage that protection against atmospheric influences and against damage by vandalism is obtained.

Preferably, the system can be equipped with means to make blocking and unblocking of the connection between vehicle and wall socket of the charging station possible, depending on the needs of the situation. This provides the advantage that a customer cannot leave without a valid settlement, or that the system can function as parking lock at your own parking space for example.

Preferably, the vehicle is equipped with an alignment assistant that allows the car to be exactly positioned such that the connector can be slid into the socket in a sufficiently accurate way and an electric connection can be made.

This alignment assistant can take several forms, from a simple mechanical sight or a periscope mirror at a 45° angle above the wall socket to a laser or LED-assisted positioning system or a magnet-assisted system and can be provided with an automatic centering, such that in case of an imperfect positioning the deviation can be corrected.

Even if the positioning is not completely perfect because the front plane of the connector is not parallel with the plane of the socket, a limited deviation is acceptable, because the socket can pivot over a limited angle around its central vertical rotation axis and can adapt to the plane of the socket.

Preferably, a distance sensor is built in which notifies the driver about the distance between the wall socket and the connector by means of an auditive signal in the vehicle.

Obviously, the vehicle can be equipped with its own electronic operating system for managing the charge, with which for example the start time and duration of the charge can be selected, and which takes into account the charging condition of the batteries.

BRIEF DESCRIPTION OF THE DRAWINGS

With the intention of better showing the characteristics of the invention, a preferred embodiment of the system according to the invention to couple electricity-consuming vehicles to a source of energy is described hereinafter, by way of an example without any limiting nature, with reference to the accompanying drawings wherein:

FIG. 4 shows FIG. 1 but now in uncoupled condition and with the connector folded in;

DESCRIPTION OF THE PREFERRED EMBODIMENTS

Figure 1:
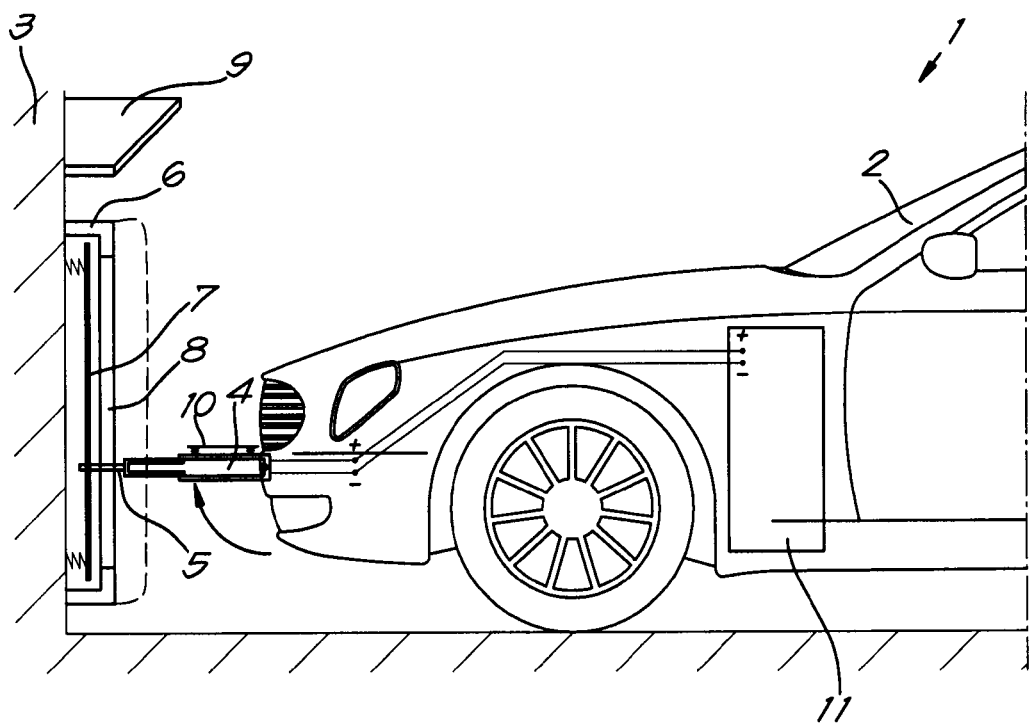
FIG. 1 schematically shows a lateral view of a system according to the invention for coupling an electricity-requiring vehicle to a charging station in coupled condition.

FIG. 1 shows the system 1 for coupling an electricity-requiring vehicle 2 to a charging station 3 according to the invention comprising an automatic fold-out and extendable connector 4 on the vehicle 2 which is provided with five further extendable electrodes 5 and comprising a wall socket 6 attached to a charging station 3 with five contact electrodes 7 which are accessible via five vertical slots 8.

Above the wall socket 6 a periscope mirror 9 has been provided in this case at a 45° angle directed to the driver of the vehicle 2 as an alignment assistant when positioning the connector in the wall socket. The connector 4 is located behind the vehicle's number plate 10 but is now folded out together with the number plate 10 such that the electrodes 5 of the extendable connector 4 are located in a horizontal plane. Once contact has been made between the electrodes 5 of the extendable connector 4 and the contact electrodes 7 in the wall socket 6, electrical energy can flow from the charging station 3 to the storage battery 11 of the vehicle 2.

Figure 2:
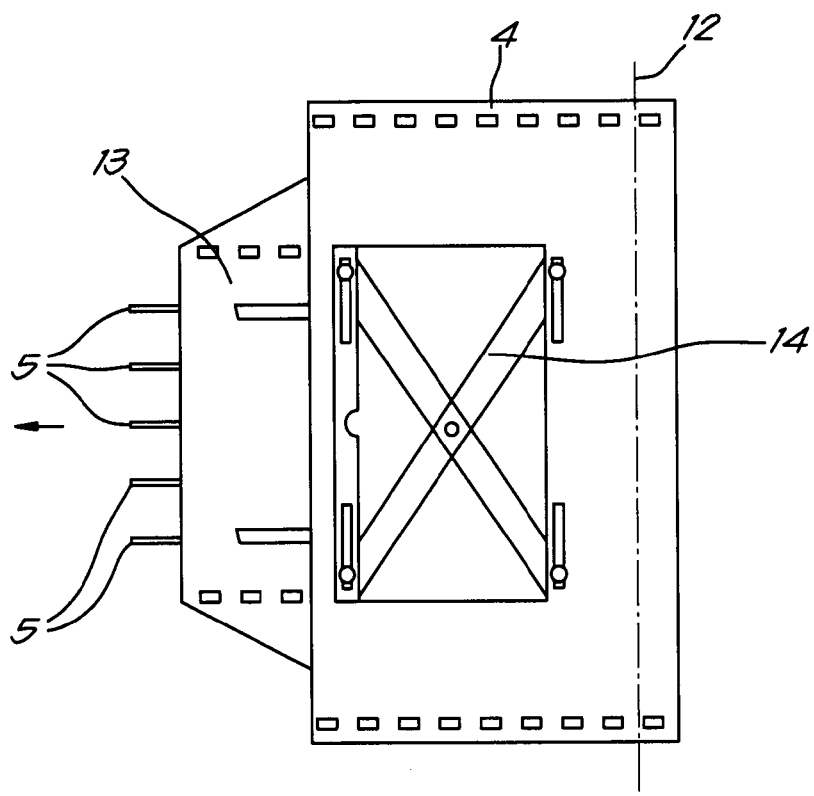
FIG. 2 shows a top view of a connector on a vehicle according to the invention in extended condition.

In FIG. 2 a top view is shown of the system's extendable connector 4 for coupling an electric-powered vehicle in fully extended condition. The connector 4 can be folded out around its horizontal rotation axis 12 and is also provided with an extendable section 13 that can be extended by means of a powered mechanism. The extendable section 13 bears the five electrodes of the connector 4, which are themselves also extendable from the extendable section 13, thus exposing the five electrodes 5 and allowing them to make an electrical contact with the wall socket 6 in which they need to be inserted.

Figure 3:
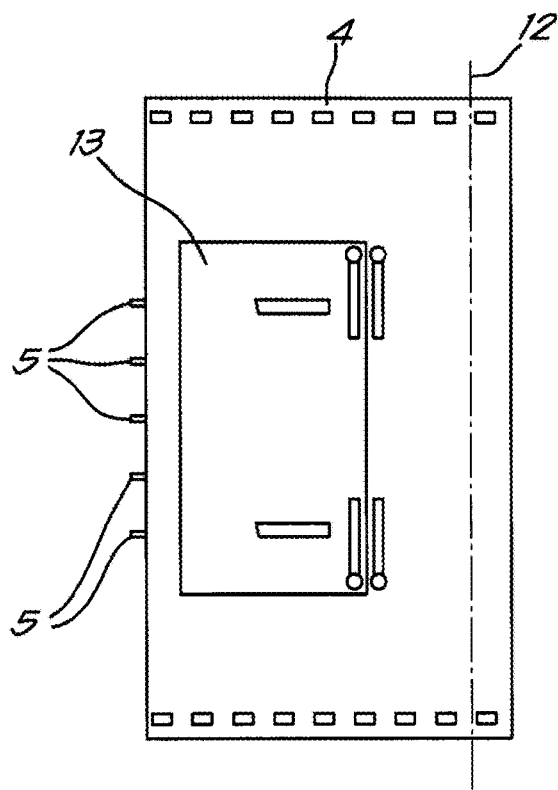
FIG. 3 shows FIG. 2 but now in retracted condition.

FIG. 3 shows the extendable connector 4 of the system according to the invention for coupling a vehicle to a charging station 3, but now in retracted condition, whereby the five electrodes 5 are retracted into the extendable section 13 and this extendable section 13 is in turn retracted into the connector 4, which is in a horizontal condition and still needs to be folded in around its horizontal rotation axis 12 to a vertical position to make the number plate in the front of the vehicle visible again in traffic.

Figure 4:
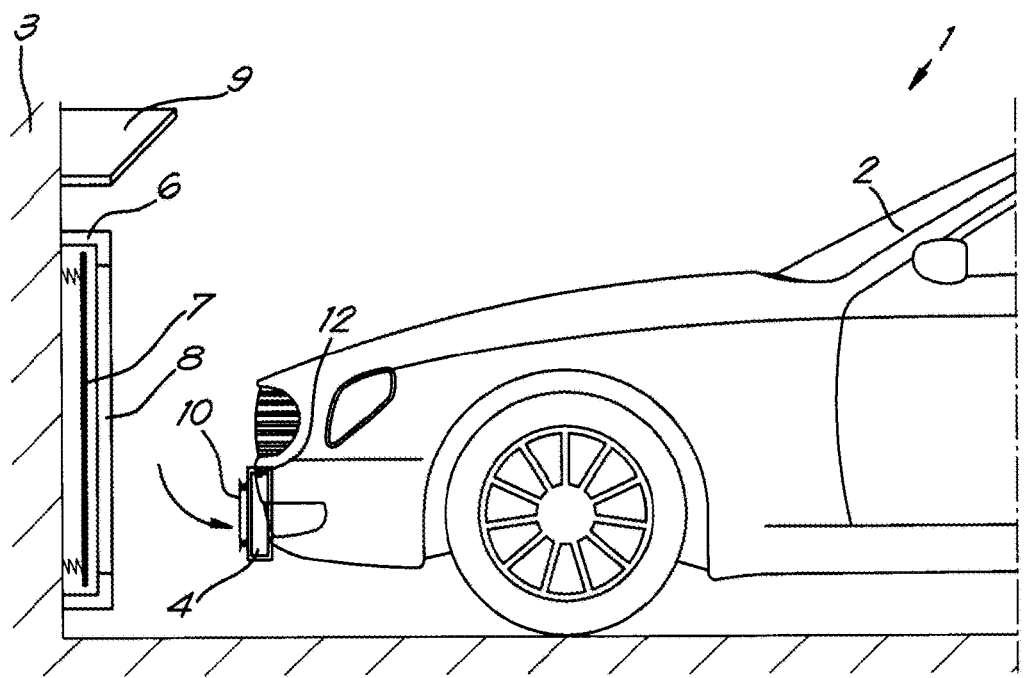

FIG. 4 shows a lateral view of an electric-powered vehicle 2, that is uncoupled from the wall socket 6 on a charging station 3, after the connector 4 on the vehicle is fully retracted and folded into a vertical position, whereby the number plate 10 of the vehicle 2 is visible again.

Figure 5:
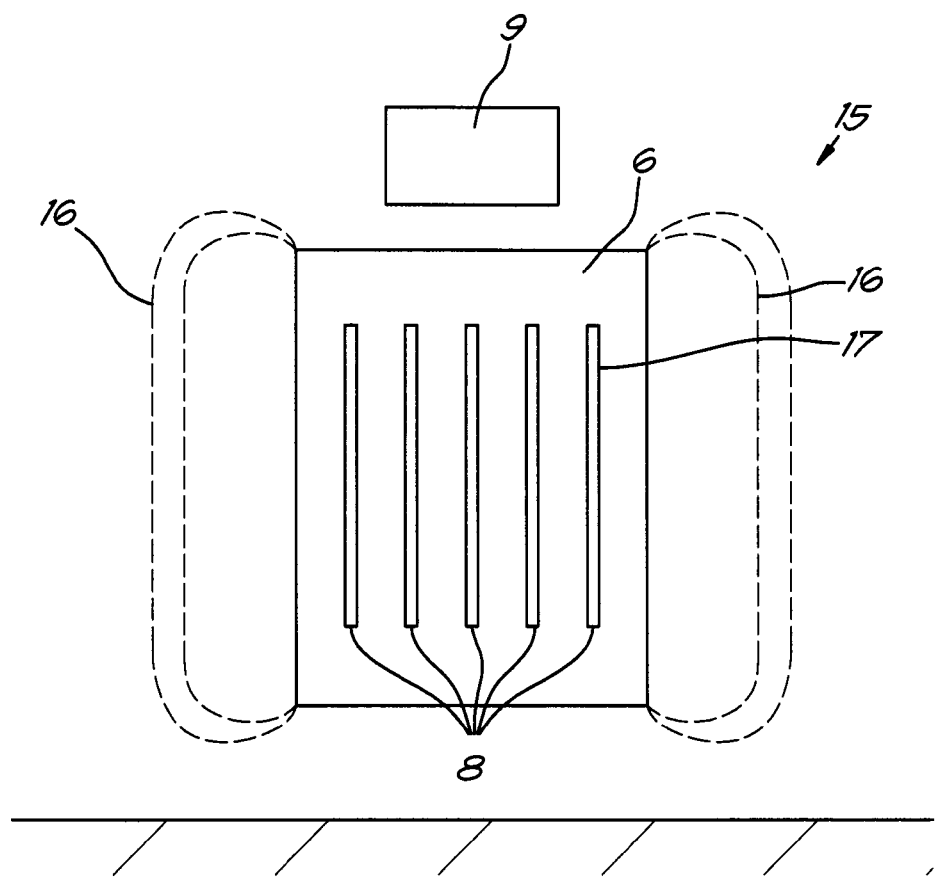
FIG. 5 shows a front view of the socket and periscope mirror at a charging station.

FIG. 5 shows a frontal view of a wall socket 6 on a wall 15 of a charging station 3, that is provided with five vertical slots 8, behind which five contact electrodes 17 are located, and which on either side are provided with flexible guides 16 which prevent damage to the wall socket 6 and the vehicle 2 to be charged. Above the wall socket 6 a periscope mirror 9 is located in this case which is directed at a 45° angle toward the driver of the vehicle 2, such that he is able to correctly judge his position in relation to the wall socket 6.

Figure 6:
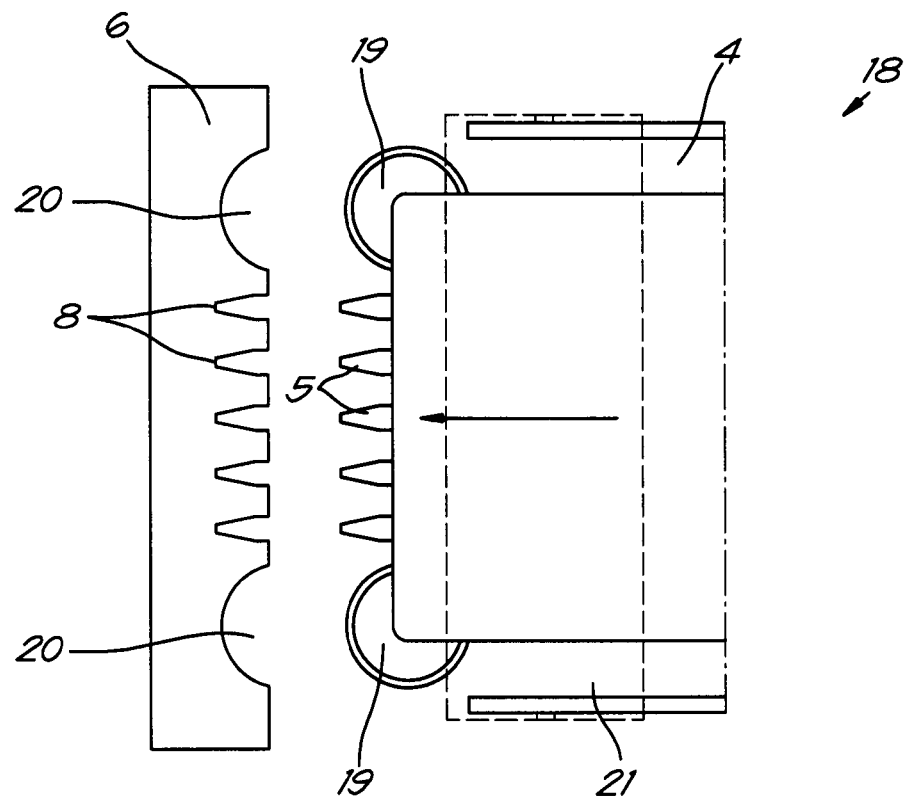
FIG. 6 shows a top view of a variant embodiment of a connector and a wall socket according to the invention.

FIG. 6 shows a variant embodiment 18 of a connector 4 and a wall socket 6 according to the invention whereby the extendable connector 4 is provided with five electrodes 5 framed by two vertical protruding bodies 19 that respectively fit into five vertical slots 8 and in two framing vertical voids 20 of the wall socket 6, whereby the connector 4 is brought against the wall socket 6 by driving the vehicle against it and by inserting the electrodes 5 into the slots 8 thereto intended.

Figure 7:
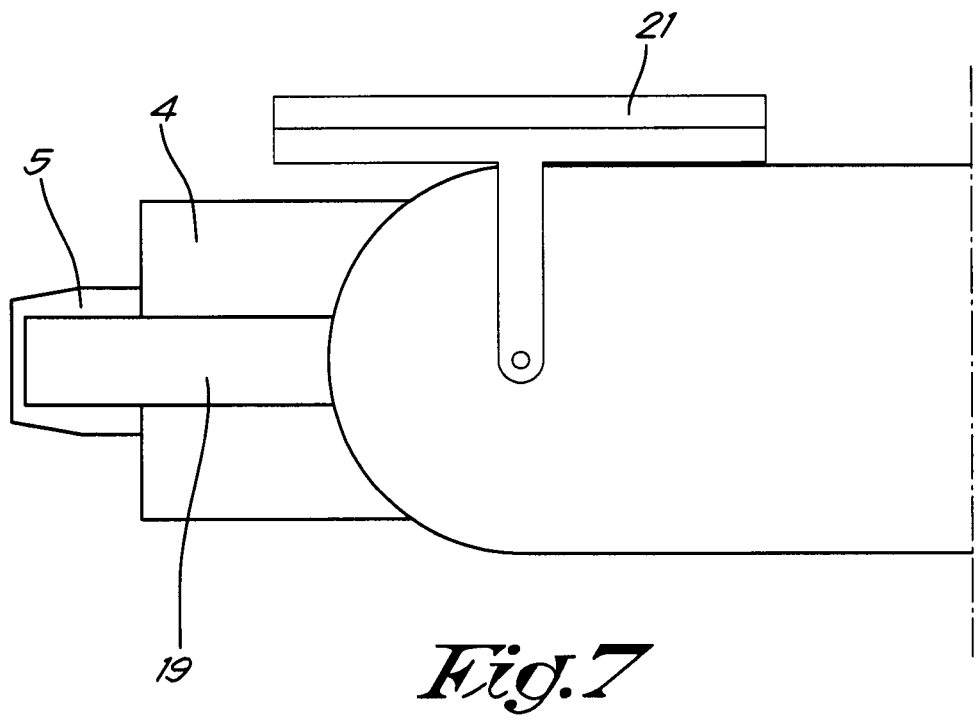
FIG. 7 shows a side view of FIG. 6.

FIG. 7 shows a side view of the variant embodiment of FIG. 6, after it was protruded under the upwardly flipped license plate 21 in order to make contact with the wall socket 6.

Figure 8:
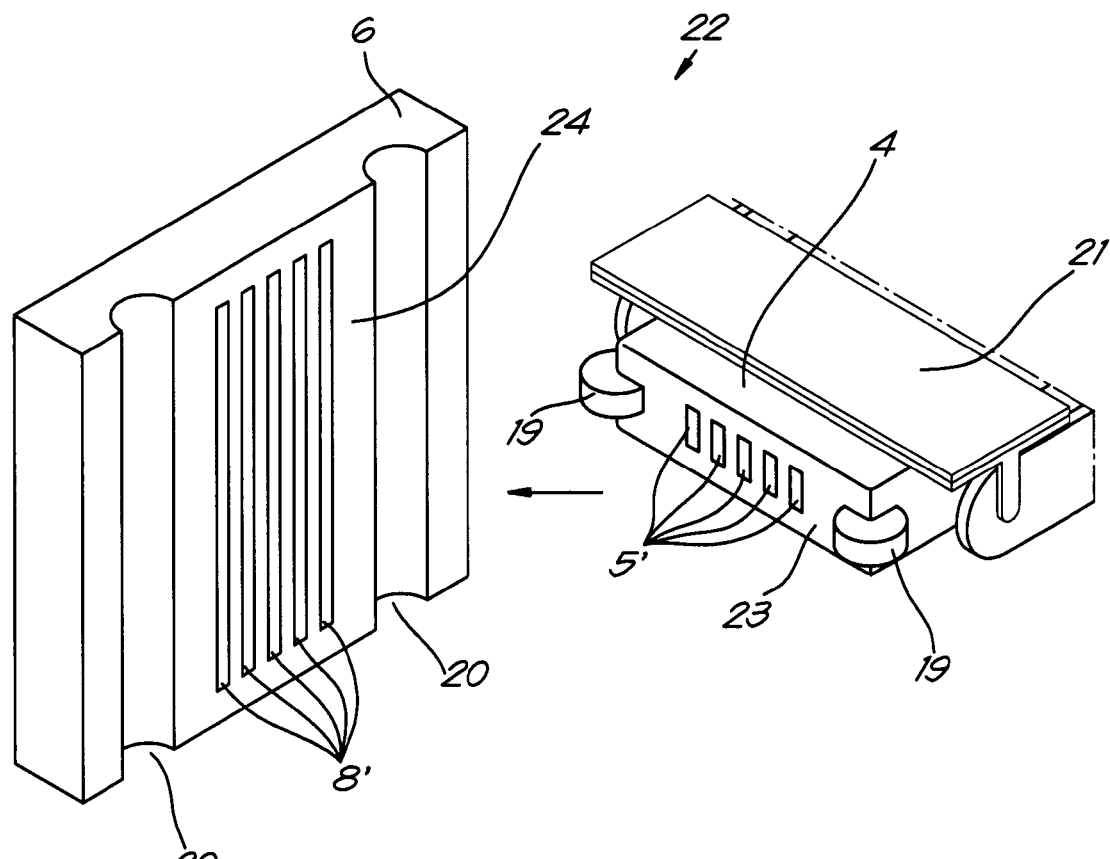
FIG. 8 shows a view in perspective of another variant embodiment of a connector and a wall socket according to the invention

FIG. 8 shows yet another variant embodiment 22 of a connector 4 and wall socket 6 according to the invention, whereby in this case the length of the electrodes 5 is reduced to zero, and these are reduced to conductive contact surfaces 5' in the contact surface 23 of the connector 4, and whereby also the depth of the slots 8 is reduced to zero and the slots are replaced by conductive vertical contact surfaces 8' in the contact surface 24 of the wall socket 6.

The operation of the system according to the invention is very simple and as follows.

The wall socket 6 is provided, for example, at a parking space where it needs to be accessible for the front and back of the vehicle 2 and is connected to an electric power source, for example the public grid. Thanks to the availability of connection points to the public grid, both at home and in the public environment, such sockets can be spread on a relatively large scale.

An example of such a location is at a car park of a supermarket, with the intention that customers can charge their electric-powered car 4 while their vehicle is parked and they are shopping.

To this end the customer positions his car 2 with its front opposite a wall socket 6 with the aid of an alignment assistant such as for example a periscope mirror at a 45° angle 9 above the wall socket 6 or a camera, after he has folded out or up his connector 4 which is hidden behind the number plate 10 in the front of the vehicle 2 to a horizontal position, parallel with the bottom.

He is assisted in this by the flexible guides 16 provided on either side of the socket and which prevent damage to the wall socket 6 and the vehicle 2 to be charged. In an alternative embodiment 18 he is assisted in this by the protrusions 19 on the connector 4, that fit into the voids 20 that are provided in the wall socket 6.

In a next step the five electrodes 5 themselves are extended by the connector 4 and inserted in the vertical slots 8 in the wall socket 6 whereby electrical contact is made, and the vehicle 2 can optionally be locked to the wall socket 6. After charging, the vehicle can be unlocked in a first step whereby the five electrodes 5 are retracted into the connector 4 again, or the entire connector 4 is retracted, and the electrical contact is interrupted.

In an alternative embodiment the electrodes are replaced by conductive contact surfaces 5' in the contact surface 24 of the wall socket 6.

In a next step the vehicle will reverse and subsequently the horizontal connector 4 will fold in or retract again, such that the number plate 10,21 is visible again for the traffic.

It is clear that in this way the connector 4 on the vehicle 2 can make or interrupt a connection with the wall socket 6 by the movement of the vehicle 2 itself and this without requiring any handling of the driver or another external person.

Means are provided in the charging station to measure the amount of transferred energy, with a view to the possible settlement of the energy cost and these means will also, for example, require an identification of the customer or his credit card, which can be provided by the vehicle via one of the extended electrodes 5 of the connector 4.

When the vehicle is parked in the wall socket 6, with the system according to the invention, the connection is automatically protected against vandalism and other external factors whereby, if desired, an additional locking in the wall socket can be provided which immobilizes the vehicle and thus provides extra security against theft or unauthorized departure of the vehicle.

This additional locking can for example be operated by the user of the vehicle or by the operator of the charging station.

The charging can be interrupted by, for example, activating a button in the vehicle, whereby in a first step the electrodes of the connector are retracted again, and in a second step the vehicle is reversed away from the wall socket, and in a next step the connector is folded in again to a vertical position, whereby of course first a possible locking at the charging point needs to be unlocked.

The wall socket 6 can be located in a private parking space, but also in public buildings or parking facilities provided with the possibility of charging. The time that vehicles are parked can in this way be utilized to realize relatively long charging times, without the driver having to go to specific main distribution points of the power source.

Of the five extended electrodes one, for example, can be used as earthing, two or three for two-phase or three-phase power, and one for two-way data transmission.

Optionally, the system can be equipped with a distance sensor with an auditive signal to help the driver position his vehicle (not shown in the figures).

Furthermore, the socket 6 and the vehicle 2, more specifically the connector 4 on the vehicle 2, can be provided with an automatic centering in relation to each other, for example because the slots 8 are provided with a conical bevelled edge and/or the electrodes of the connector 4 taper forward, such that even when the vehicle is not perfectly aligned in relation to the socket 6, there is an automatic guidance which puts the connector 4 in the right position.

Additionally, the necessary degrees of freedom can be provided to this end which allow the electrodes of the connector 4 to move over a limited range in relation to their neutral position, which can be realized by springs or other flexible means.

In a variant embodiment 18 the connector is provided with five electrodes 5 framed by two vertical protruding bodies 19 that fit respectively in five vertical slots 8 framed by two vertical framing voids 20 of the wall socket 6, whereby the connector 4 is brought against the wall socket 6 by driving the vehicle against it and by introducing the electrodes 5 into the vertical slots 8 intended for them.

This variant embodiment of the connector with five electrodes 5 and two protruding bodies 19 is pushed forward after being guided under the upwardly flipped license plate 21, in order to make contact with the wall socket 6.

In yet another variant embodiment of a connector 4 and a wall socket 6 according to the invention, the length of the electrodes 5 in the connector 4 is reduced to zero and to conductive contact surfaces 5' in the contact surface 23 of the connector, and is also the depth of the slots reduced to zero to conductive vertical contact surfaces in the contact surface 24 of the wall socket 6. In this case the conductive contact surfaces 5' are obviously surrounded by electrically isolating materials.

Obviously, the system for coupling electricity-requiring vehicles to a source of electrical energy according to the invention can be used in the two directions, i.e. both for charging batteries in the vehicle, and for the discharge of electricity from the batteries to the charging station or the grid to which it is connected.

Obviously, the number of electrodes does not have to be limited to five extended electrodes, but a larger or smaller number of electrodes can also be used. It is of course preferable that there is a generally accepted standard with a defined number of electrodes, such that this configuration can be generalized.

In an alternative embodiment, the connector (4) is a vertically extendable connector from the bottom of the vehicle, after which the connector can vertically extend further in the direction of a floor socket with five horizontal slots in the floor which are located in the longitudinal or movement direction of the vehicle.

The vertically extendable connector can subsequently be mounted in the front, at the back or any position under the vehicle. The positioning of the connector is subsequently done using sensors or other means such as visual, auditive or magnetic means. The GPS network can be helpful in this.

The present invention is by no means limited to the embodiments described as an example and shown in the figures, but a connection system according to the invention that can be realized in all kinds of forms and dimensions without departing from the scope of the invention, as is described in the following claims.

The invention claimed is:

1. System (1) for coupling electricity-requiring vehicles (2) to a source of electrical energy, with an automatic fold-out connector or a forwardly extendable connector (4) on the front of a vehicle (2) wherein the connector is provided with five electrodes (5) that are extendible from the connector in the direction of a socket (6) attached to a charging station (3) with five contact electrodes (7) which are accessible via five vertical slots (8).

2. System (1) according to claim 1, wherein the automatic fold-out connector (4) can be folded out from a vertical to a horizontal position around a rotation axis at the top of the connector or around a rotation axis on the bottom of the connector, after which the connector can extend horizontally in the direction of a wall socket (6) with five vertical slots.

3. System according to claim 2, wherein the connector (4) can pivot over a limited angle around a central vertical rotation axis and can adapt to the plane of the socket (6).

4. System according to claim 1, wherein the automatic fold-out connector (4) is mounted behind the license plate (10) of the vehicle (2), in the front or at the back of the vehicle.

5. System according to claim 4, wherein the automatic fold-out connector (4) can automatically fold out from a vertical position to a horizontal position, via a control button in the vehicle (2) or via an electronic signal.

6. System according to claim 1, wherein the automatic fold-out or a forwardly extendible connector (4) is positioned opposite a wall socket (6) with the aid of an alignment assistant, after the connector (4), which can be hidden behind the license plate (10) at the front of the vehicle (2), is folded out or is extended forwardly to a horizontal position, parallel with the ground surface.

7. System according to claim 6, wherein the positioning is aided by the flexible guides (16) provided on either side of the wall socket (6) and which prevent damage to the wall socket (6) and the vehicle (2) to be charged.

8. System according to claim 6, wherein the alignment assistant takes the form of a laser- or LED-assisted positioning system, that is provided with an automatic centering, such that in case of an imperfect positioning the deviation can be corrected.

9. System according to claim 1, wherein in the automatic fold-out connector (4) or the forwardly extendable connector (4) can extend the five electrodes (5) in the direction of a socket (6) by means of a mechanical system (14) in the direction of a socket (6) attached to a charging station, whereby the five contact electrodes (13) move horizontally in the direction of the electrodes in the wall socket (6).

10. System according to claim 9, wherein in a next step the five electrodes (5) themselves are inserted in the vertical slots (8) in the wall socket (6) whereby electrical contact is made.

11. System according to claim 10, wherein the five electrodes (5) after contact is made with a sensor in the wall socket (6) automatically transfer electrical energy from the charging station (3) to a battery (11) in the vehicle (2).

12. System according to claim 11, wherein after the charging in a following step the vehicle (2) can be unlocked whereby the five electrodes (5) are retracted into the connector (4), and the electrical contact is interrupted.

13. System according to claim 12, wherein in a next step after the retraction, the vehicle (2) will reverse and subsequently the connector will return to an original position by retracting or by folding in again to a vertical position such that the license plate (10) is visible again for the traffic.

14. System according to claim 11, wherein the charging can be interrupted by sending a signal from the vehicle (2) to the connected charging station (3), or by interrupting the physical contact of the electrodes with the charging station by mechanically retracting the electrodes (5) again.

15. System according to claim 14, wherein the five electrodes (5) and the connector (4) are themselves mechanically retracted again after the charge by a control button in the vehicle (2) or via an electronic signal, and the connector (4) is also retracted or folded in again to a vertical position, such that the license plate (10) is visible again on the usual spot of the vehicle (2).

16. System according to claim 10, wherein via at least one of the inserted electrodes (5) data is transmitted from the vehicle (2) to the charging station (3), but data is also transmitted from the charging station (3) to the vehicle (2).

17. System according to claim 1, whereby a distance sensor is built in which notifies the driver about the distance between the socket (6) and the connector (4) by means of an auditive signal.

18. System according to claim 1, wherein the vehicle (2) is equipped with an electronic operating system for managing the charge, with which the start time and duration of the charge can be selected, and which takes into account the charging condition of the batteries (11).

19. System according to claim 1, wherein the system (1) is provided with means to make locking and unlocking of the connection between vehicle (4) and socket (6) possible.

20. System according to claim 1, wherein the extendable connector (4) is provided with electrodes (5) framed by two vertical protruding bodies (19) that fit respectively into five vertical slots (8) and in two framing vertical voids (20) of the wall socket (6), whereby the connector (4) is brought against the wall socket (6) by driving the vehicle against the wall socket and by inserting the electrodes (5) in the slots (8) intended thereto.

21. System according to claim 20, wherein the connector (4) with the five electrodes (5) or the five conductive surfaces (5') and two protruding bodies (19) is pushed forward, after being guided under the upwardly flipped license plate (21), in order to make contact with the wall socket (6).

22. System according to claim 1, wherein the length of the electrodes (5) is reduced to zero and these are reduced to conductive contact surfaces (5') in the contact surface (23) of the connector (4) and whereby also the depth of the slots (8) is reduced to zero and the slots (8) are replaced by conductive vertical contact surfaces (8') in the contact surface (24) of the wall socket (6).

\* \* \* \* \*